United States Patent [19]

Nohira et al.

[11] 4,164,032

[45] Aug. 7, 1979

[54] COMPUTER CONTROL OF AN EXHAUST GAS RECIRCULATION DEVICE FOR AN INTERNAL COMBUSTION ENGINE

[75] Inventors: Hidetaka Nohira, Mishima; Kiyoshi Kobashi, Susono; Jiro Nakano, Toyota, all of Japan

[73] Assignee: Toyota Jidosha Kogyo Kabushiki Kaisha, Aichi, Japan

[21] Appl. No.: 858,533

[22] Filed: Dec. 7, 1977

[30] Foreign Application Priority Data

Sep. 27, 1977 [JP] Japan .................................. 52-115103

[51] Int. Cl.² ...................... F02M 25/06; G06F 15/46
[52] U.S. Cl. ................................ 364/431; 123/117 D; 123/119 A
[58] Field of Search ............................... 364/431, 442; 123/32 EB, 117 D, 119 A

[56] References Cited

U.S. PATENT DOCUMENTS

| | | | |
|---|---|---|---|
| 3,799,133 | 3/1974 | Frank | 123/119 A |
| 3,807,376 | 4/1974 | Glockler et al. | 123/119 A |
| 3,969,614 | 7/1976 | Moyer et al. | 364/442 |
| 4,011,845 | 3/1977 | Mayer et al. | 123/119 A |
| 4,018,198 | 4/1977 | Williams | 123/119 A |
| 4,026,256 | 5/1977 | Fenn | 123/119 A |
| 4,060,065 | 11/1977 | Hata et al. | 123/119 A |

FOREIGN PATENT DOCUMENTS 49-77028    7/1974    Japan

Primary Examiner—Felix D. Gruber
Attorney, Agent, or Firm—Stevens, Davis, Miller & Mosher

[57] ABSTRACT

Disclosed herein is a computer control system of an exhaust gas recirculation device for an internal combustion engine, wherein values of the parameters of desired EGR ratios when various conditions in the engine intake system exist are preliminarily stored in the memory of the computer, and wherein a value of a parameter is read out from the memory by detecting a value of the engine condition during its operation. In the system, values of temperature correction factors with respect to at least one temperature characteristic of the engine are also preliminarily stored in the memory. A temperature correction value is read out from the memory in accordance with a detected temperature value of at least one portion of the engine. The computer calculates the amount of EGR needed from the read out values of desired EGR and temperature correction and produces an electrical signal for controlling operation of the EGR value.

9 Claims, 7 Drawing Figures

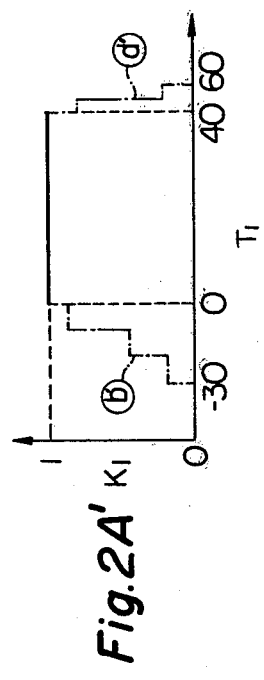
Fig.2A $K_1$
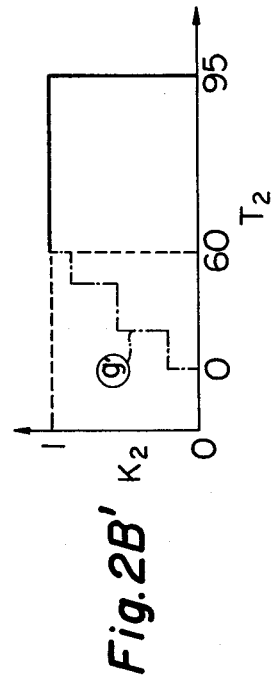
Fig.2B $K_2$
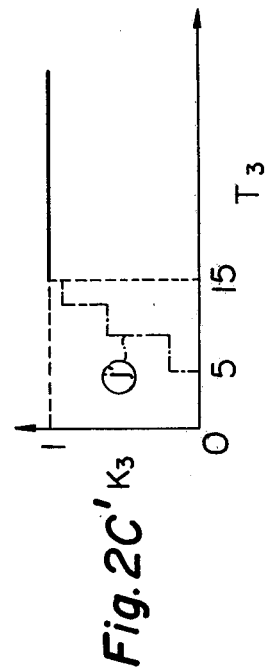
Fig.2C $K_3$
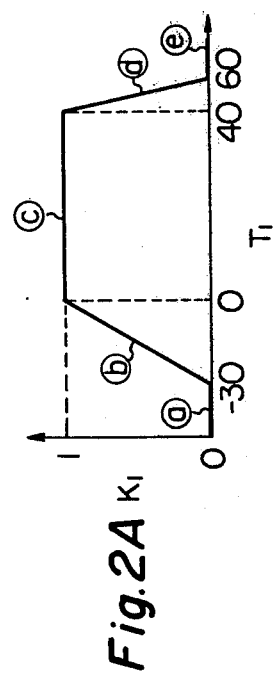
Fig.2A' $K_1$
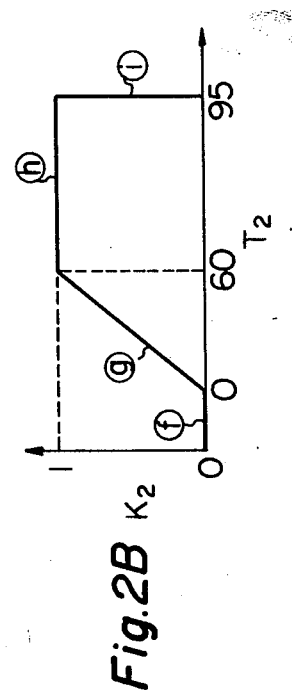
Fig.2B' $K_2$
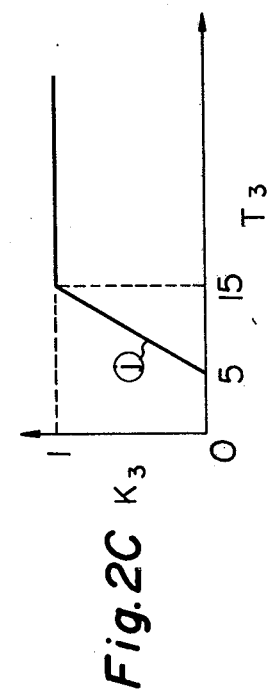
Fig.2C' $K_3$

COMPUTER CONTROL OF AN EXHAUST GAS RECIRCULATION DEVICE FOR AN INTERNAL COMBUSTION ENGINE

FIELD OF THE INVENTION

The present invention relates to a method and an apparatus for controlling an internal combustion engine provided with an exhaust gas recirculation device.

BACKGROUND OF THE INVENTION

In an exhaust gas recirculation device for decreasing the emission of $NO_x$ components in the exhaust gas of an internal combustion engine, it is necessary to maintain an appropriate EGR ratio adapted to an engine condition in order to obtain a maximum EGR effect while maintaining a maximum fuel consumption efficiency, and in order to prevent an adverse effect from occurring during the operation of the engine. In conventional EGR devices which are widely used, various vacuum control mechanisms are utilized for effecting the control of the EGR ratio.

In recent developments of the EGR device, a device controlled by a computer has been proposed for controlling the EGR ratio. In such a system, values of the parameters of the EGR ratio, for example, values of the intake pressure, opening of the EGR valve, etc., are preliminarily stored in a memory of the computer with respect to values indicating the conditions of the engine intake system, for example, values indicating the engine rotational speed and the amount of air intake. When the engine is operating, a value of the parameter of the EGR ratio is read out from the memory by sensing the engine rotational speed and the amount of intake air. The read-out value is utilized for feed-back or feed-forward controlling of the amount of exhaust gas so that a desired value of the EGR ratio adapted to a corresponding engine condition is obtained.

Generally speaking, the temperature conditions of the engine, for example, the temperature of the intake air, the cooling water, the engine cylinder block cooling water, are very important for determining the EGR ratio. For example, the EGR operation should be stopped or decreased when the engine is being warmed or when it is overheated. Therefore, various mechanisms have been proposed for utilization in the conventional vacuum-operated EGR system for controlling the transmission of a vacuum signal from the engine intake pipe to the EGR valve when the engine is warmed from a cold engine or when it is overheated.

Such temperature control of the EGR ratio is also required in the above-mentioned computer-controlled type of EGR device.

SUMMARY OF THE INVENTION

An object of the invention is to provide a method for operating a computer-controlled EGR device, which method is capable of effecting temperature control of the EGR ratio.

Another object of the invention is to provide a novel exhaust gas recirculation apparatus having a computer control system, capable of effecting a temperature control of the EGR ratio.

According to one aspect of the invention, a method for controlling an exhaust gas recirculation device of an internal combustion engine is provided, which device has a pressure-operated flow control valve located on a recirculation passageway connecting the engine exhaust system with the engine intake system, and has an electrically-operated actuator means located on a pressure signal conduit connecting a pressure signal port of the engine with the flow control valve for controlling the opening of the flow control valve to control the amount of the exhaust gas to be recirculated, such method comprising the steps of:

(a) initially storing in a memory unit of an electrical computer a set of first values corresponding to the amount of the exhaust gas to be recirculated, each of the first values being predetermined in accordance with a desired amount of exhaust gas to be recirculated when the engine is in a respective operating condition;

(b) initially storing in the memory unit at least one set of second values, each set of second values corresponding to temperature correction factors Ki, where $0 \leq Ki \leq 1$, for altering the amount of exhaust gas to be recirculated, each of said second values of each set being predetermined in accordance with a desired temperature correction factor corresponding to the temperature of a respective portion of the engine;

(c) generating a first electrical signal indicating a sensed respective engine condition during the time when the engine is being operated, by using a first sensor means mounted onto the engine;

(d) generating at least one second signal indicating a sensed temperature of a respective portion of the engine during the time when the engine is being operated, by using a second sensor means mounted onto the engine;

(e) reading, by the computer, programmed to respond to said first and at least one of said second electrical signals, a first stored value corresponding to the sensed engine condition and at least one second stored value corresponding to the temperature correction factor Ki for a sensed temperature;

(f) calculating, by the computer programmed to respond to the read-out values, a third value corresponding to a desired opening of the pressure-operated flow control valve;

(g) forming, by using the calculated value, a third electrical signal which is transmitted to the electrically-operated actuator means for controlling the opening of the flow control valve; and (h) repeating, at a predetermined interval, steps (c) through (g) during the time the engine is in operation.

Another aspect of this invention is an exhaust gas recirculation device of an internal combustion engine, which device comprises:

a recirculation passageway connecting the engine exhaust system with the engine intake system;

a pressure-operated flow control valve located on the recirculation passageway for controlling the amount of exhaust gas to be recirculated;

a pressure signal conduit connecting a pressure signal port in the engine intake with the flow control valve;

an electrically-operated actuator means located in the conduit for controlling the opening of the flow control valve;

a memory device for storing a set of first values corresponding to the amount of the exhaust gas to be recirculated, these values being predetermined in accordance with desired amounts of exhaust gas recirculation at respective engine operating conditions, and for storing at least one set of second values corresponding to temperature correction factors for the recirculated exhaust gas, each of second values being predetermined in accordance with a desired temperature correction factor for respective temperatures of a respective portion of the engine;

a first sensor means for providing, when the engine is operating a first electrical signal indicating an engine operating condition;

at least one second sensor means for providing, when the engine is operating, a second electrical signal indicating the temperature of a respective portion of the engine; and a computer device programmed, in response to the first and second electrical signals, to read a stored first value and at least one second value, to calculate from said read first and second values a value corresponding to the opening of the pressure-operated flow control valve, and to form an electrical signal corresponding to the calculated value which is transmitted to the electrically-operated actuator means for controlling the opening of the flow control valve.

BRIEF DESCRIPTION OF THE DRAWINGS

FIGS. 2-A, 2-B, 2-C, 2-A', 2-B' and 2-C' are graphs which show the relations between the temperatures of the respective portions of the engine, $T_1$, $T_2$ and $T_3$ and the correction factors of the EGR ratios $K_1$, $K_2$ and $K_3$, respectively;

DESCRIPTION OF PREFERRED EMBODIMENTS

Figure 1:
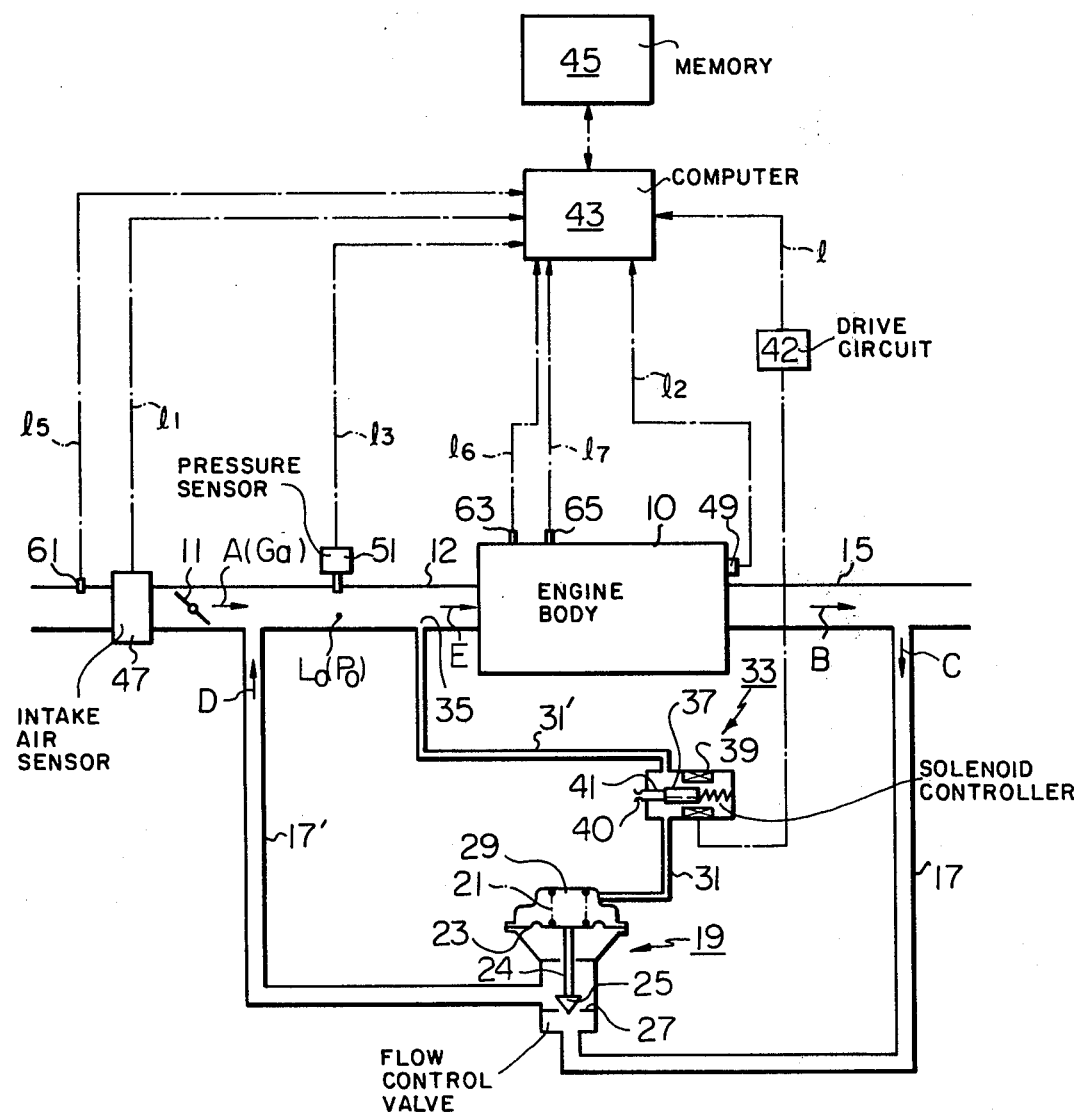
FIG. 1 is a schematic diagram showing a computer-controlled exhaust gas recirculation apparatus according to a first embodiment of the invention.

In FIG. 1 showing a first embodiment of the present invention, reference numberal 10 designates an engine body of an internal combustion engine. The engine has an intake passageway 12 connected to the engine body 10, in which passageway a throttle valve 11 is arranged for controlling the amount of combustible mixture supplied to the engine body 10 as shown by an arrow A. A resultant exhaust gas due to the combustion in the engine body 10 is discharged to an exhaust passageway 15 connected thereto as shown by an arrow B. A part of the exhaust gas in the exhaust passageway 15 is diverted to an exhaust gas recirculation (EGR) passageway 17 as shown by an arrow C. The thus diverted exhaust gas is reintroduced into the intake passageway 12 via an exhaust gas recirculation passageway 17' as shown by an arrow D. In order to control the amount of exhaust gas to be recirculated, a vacuum-operated flow control valve, which is generally shown by a reference numeral 19, is situated between the EGR passageways 17 and 17'. The valve 19, referred to as the EGR valve, is comprised of a valve seat 27, a valve member 25 facing the valve seat 27, a diaphragm 23 connected to the valve member 25 via a rod 24, and a spring 21 urging the diaphragm 23 so that the valve member 25 is moved toward the valve seat 27. A vacuum chamber 29 is formed on one side of the diaphragm 23 remote from the valve member 25. Therefore, the position of the valve member 25 with respect to the valve seat 27, in other words the opening of the EGR valve 19, is controlled in response to the vacuum level in the vacuum signal chamber 29, for controlling the amount of the exhaust gas to be recirculated. In order to generate a vacuum in the chamber 29, this chamber is connected, via a vacuum signal tube 31, an electro-magnetic type actuator valve, generally designated by a reference numeral 33, and a vacuum signal tube 31', to a vacuum signal port 35 formed in the intake passageway 12 at a position located downstream of the throttle valve 11. The electro-magnetic valve 33, serving as an actuator means of the EGR valve 19, is comprised of a valve seat 41 forming an orifice 40 opened to the atmosphere, a spring-urged valve member 37 capable of being selectively seated on the valve seat 41, and a solenoid coil 39. When the solenoid 39 is energized, the valve member 37 is detached from the valve seat 41, causing an amount of atmospheric air to be introduced into the vacuum signal tube 31. Therefore, the vacuum level in the vacuum signal chamber 29 of the EGR valve 19 is decreased, causing the valve member 25 to be moved toward the valve seat 27 due to the force of the spring 21. As a result the opening of the EGR valve 19 is reduced, thus decreasing the amount of the exhaust gas to be recirculated from the exhaust passageway 15 to the intake passageway 12. When the solenoid 39 is de-energized, the valve member 37 of the actuator valve 33 is seated on the valve seat 41 to prevent the introduction of the atmospheric air into the vacuum tube 31. Therefore, the vacuum level in the vacuum signal chamber 29 is increased, causing the valve member 25 to be moved away from the valve seat 27 against the force of the spring 21. As a result, the opening of the EGR valve is enlarged, thus increasing the amount of the exhaust gas to be recirculated. As is clear from the previous description, the actuator valve 33 operates to control the vacuum level in the chamber 29 of the EGR valve 19 by selectively introducing atmospheric air into the vacuum tube 31, so that the amount of the exhaust gas to be recirculated is controlled. As will be fully described later, in order to obtain an appropriate amount of EGR gas during every type of engine condition, the solenoid of the actuator valve 33 is selectively energized or de-energized by the electrical signals applied thereto from a drive circuit 42 connected via an electrical line l, to an electronic computer 43. The computer 43 operates to issue a logic signal "1" or 37 0" to the drive circuit 42 for controlling the EGR ratio (the ratio of the amount of exhaust gas to be recirculated as shown by the arrow D to the total amount of gas directed to the engine as shown by the arrow E).

Figure 4:
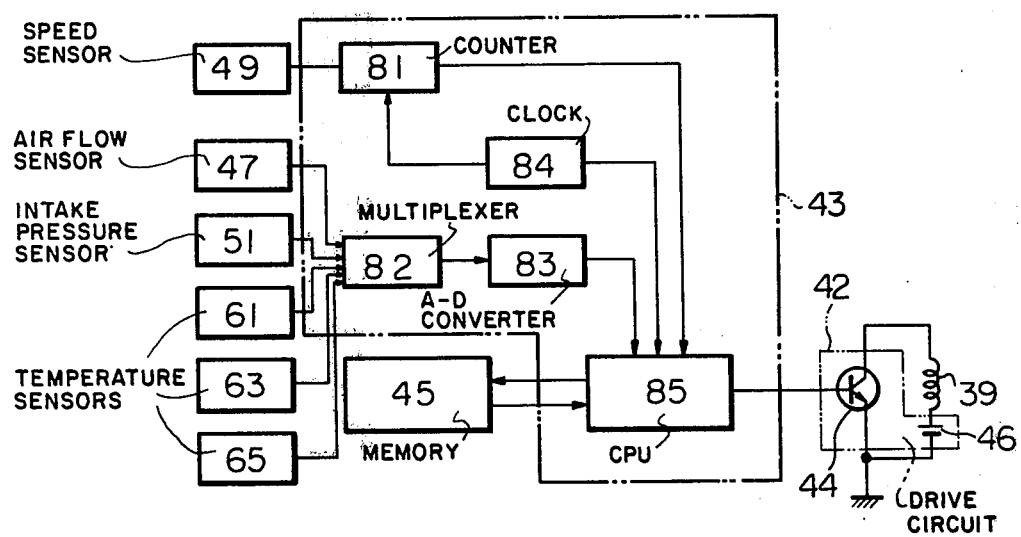
FIG. 4 is a block diagram of the computer shown in FIG. 1.

The drive circuit 42 has a transistor 44 and a battery 46 connected to the solenoid 39 of the EGR valve actuator as shown in FIG. 4. When a logic signal "1" from the computer 43 is received by the base of the transistor 44, the transistor 44 is in its ON condition by which the emitter and the collector are connected with each other, thus causing an electric current to be passed through the solenoid 39 for energizing it. The valve member 37 of FIG. 1 is thus moved away from the valve seat 41 for decreasing the vacuum level in the chamber 29 of the EGR valve 19. As a result, the valve member 25 is moved to decrease the amount of the recirculated exhaust gas as described hereinbefore. When a logic signal "0" is received by the base of the transistor 44 (FIG. 4), it is in its OFF condition in which the emitter and the collector are disconnected from each other, thereby causing no electric current to pass through the coil 39. Accordingly, the valve member 37 (FIG. 1) is moved to be rested on the valve seat 41 for increasing the vacuum level in the chamber 29 of the EGR valve for increasing the amount of exhaust gas to be recirculated, as described hereinbefore.

The computer 43 has a memory 45 for effecting the computer control of the EGR system as will be fully described later.

The EGR system shown in FIG. 1 further has a well-known sensor 47 which is located on the intake passageway 12 at a position downstream of the throttle valve 11 for detecting the amount of intake air Ga which is, as shown by the arrow A, introduced into the engine 10. The flow sensor 47 is of a type which has a pivot plate (not shown) capable of being rotated in accordance with the amount of intake air passed through the plate. In addition, the pivot plate has a potentiometer (not shown) on one end thereof for providing an analogue electrical signal corresponding to the amount of intake air Ga. The potentiometer is electrically connected to the computer 43 via a line $l_1$ (FIG. 1) for issuing a signal which indicates the amount of the intake air Ga. Another sensor 49 is mounted onto the engine 10 for detecting the rotational speed N of the engine. The rotational speed sensor 49 is of a type which has a member made of a magnetic material capable of being rotated together with the crankshaft of the engine, and a reed switch which arranged near the member. When the engine is operating, the reed switch is intermittently closed for obtaining a pulsative electrical signal indicating the engine rotational speed. The reed switch is connected to the computer 43 via an electrical line $l^2$ for issuing a digital signal indicating the engine rotational speed N.

A sensor 51 is arranged on the intake passageway 12 for detecting the absolute pressure P in the intake passageway 12 at a position downstream of the EGR passageway 17'. The sensor 51 is of a well-known semiconductor type for providing an electrical signal indicating an intake pressure $P_{real}$ (absolute value) actually measured during the time when the engine is being operated. The sensor 51 is electrically connected to the computer 43 via an electrical line $l_3$ for issuing the signal measured by the sensor 51, to the computer 43.

The principle utilized in the embodiment shown in FIG. 1 for controlling the EGR operation by the computer system is described hereinafter. If we put the absolute pressure of the intake air without exhaust gas recirculation as $P_0$, the absolute pressure P is increased when compared with $P_0$ when the recirculated gas is added from the passageway 17', as shown by the arrow D. The ratio of this increase in the intake pressure corresponds, as is well-known, to the EGR ratio. Furthermore, as is also well-known, the pressure $P_0$ when the EGR is stopped corresponds to an engine condition determined by a set of values corresponding to the amount of intake air Ga supplied from the throttle valve 11 and corresponding to the rotational speed N of the engine. The values of the EGR ratio are preliminarily determined in accordance with the engine conditions for obtaining a required EGR characteristic. Accordingly, the pressure P is preliminarily determined in accordance with the sets of values of Ga and N. These predetermined values, herein referred to as "$P_{map}$", can be stored in a memory 45 of the computer 43. As a result, if the amount of the recirculated gas passed through the EGR valve 19 is controlled so that a value of the pressure $P_{real}$ actually detected by using the sensor 51 conforms to a stored value of the pressure $P_{map}$ read-out from the memory 45, the EGR ratio is controlled to a desired value which is applicable to the corresponding engine condition. In other words, in order to maintain the EGR ratio to a desired value which is applicable to the engine condition, it is necessary to control the amount of recirculated gas in such a manner that the amount is increased when the actually sensed value of the pressure $P_{real}$ detected by the sensor 51 is smaller than the stored value of the pressure $P_{map}$, and that such amount is decreased when the actually sensed pressure value $P_{real}$ is larger than the stored pressure value $P_{map}$.

In the computer-controlled EGR system employing the above-mentioned principle, a means is necessary for effecting the temperature correction of the EGR ratio when the engine is exposed to various temperature conditions. For example, when the engine is operating under a warming-up condition, that is, where the temperature of the engine has not yet fully increased to normal operating temperature, the EGR operation should be stopped or the EGR ratio should be decreased, in order to carry out a satisfactory and stable-warming-up operation of the engine. When the engine is overheated, the EGR operation should be stopped to prevent the engine from being damaged.

In the computer-controlled EGR apparatus of the present invention shown by FIG. 1, the method described hereinafter is utilized for effecting the temperature correction of the EGR ratio.

(1) First of all, according to an embodiment described herein, the temperature correction of the EGR ratio is performed by sensing the intake air temperature $T_1$ (temperature of the air introduced into the engine), the engine cooling water temperature $T_2$ (temperature of the engine cooling water at a position of the engine cooling water jacket near the inlet of the engine radiator) and the engine cylinder block coolant temperature $T_3$ (temperature of the engine cooling water at a position of the water jacket near the outlet of the engine radiator). Correction factors $K_1$, $K_2$ and $K_3$, which correspond to the temperatures $T_1$, $T_2$ and $T_3$, respectively, should satisfy the following requirement.

$$0 \leq K_1, K_2 \text{ or } K_3 \leq 1 \quad (1)$$

If any of the correction factors, $K_1$, $K_2$ or $K_3$, is equal to zero then the EGR operation should be stopped, whereas if all of the correction factors, $K_1$, $K_2$, or $K_3$, is equal to 1.0 then a temperature correction of the EGR ratio is not necessary, i.e., the EGR operation should be fully performed.

(2) Secondly the algebraic equation for calculating the intake air pressure $P_{ref}$ at the position L of FIG. 1 is represented as follows.

$$P_{ref} = C \times (Ga/N) + K_1 K_2 K_3 (P_{map} - C \times (Ga/N)) \quad (2)$$

Ga: amount of intake air
N: rotational speed of the engine

C: constant $P_{map}$: intake pressure at the position L of FIG. 1 when temperature correction is not carried out.

In equation (2), the expression $$C \times (Ga/N) \quad (3)$$

indicates intake pressure when the EGR operation is not carried out as is well-known to those skilled in this art. Therefore, the expression $$P_{map} - C \times (Ga/N) \quad (4)$$

indicates that there is an increase in the intake pressure due to an introduction of the recirculated exhaust gas. Therefore, the expression $$K_1 \cdot K_2 \cdot K_3 (P_{map} - C \times (Ga/N)) \quad (5)$$

indicates that there is an increase in the intake pressure when the temperature correction of the EGR ratio is effected. Thereby, equation (2), which is a sum of the equations (3) and (5), represents an intake pressure corresponding to the EGR ratio when the temperature correction of the EGR ratio is effected.

It should be noted that, when one of the correction factors, $K_1$, $K_2$ or $K_3$, is zero, equation (2) of $P_{ref}$ becomes equal to expression (3), which corresponds to the intake pressure when the EGR operation is not carried out. When each of the correction factors $K_1$, $K_2$ and $K_3$ is equal to 1.0, equation (2) becomes equal to $P_{map}$, which corresponds to a stored value of the intake pressure when a temperature correction of the EGR ratio is not carried out.

(3) Thirdly, the temperature correction factors $K_1$, $K_2$ and $K_3$ are determined in the following way.

FIG. 2-A indicates a relation between the intake air temperature $T_1$ and the temperature correction factor $K_1$ of the EGR ratio. When the temperature of the intake air is lower than $-30°$ C., the temperature correction factor $K_1$ is determined to have a value of zero as shown by the curve (a), in order to prevent the EGR operation from being carried out. When the temperature $T_1$ is within a range of between $-30°$ C. and $0°$ C., the temperature correction factor $K_1$ is increased in accordance with the increase of the temperature $T_1$, as shown by the curve (b), in order to gradually increase the EGR ratio in accordance with the increase of the intake air temperature. When the temperature $T_1$ of the intake air is within a range of between $0°$ C. and $40°$ C., which range is a normal operational range for an engine, the correction factor $K_1$ is maintained to a value of 1.0, as shown by the curve (c). Therefore, an effective $NO_x$ component decreasing effect produced by the EGR operation is obtained. When the intake air temperature $T_1$ is within a range of between $40°$ C. and $60°$ C., the correction factor $K_1$ is decreased in accordance with the increase of the temperature $T_1$, as shown by the curve (d), for gradually decreasing the EGR effect. When the temperature $T_1$ is higher than $60°$ C., the correction factor $K_1$ is maintained at zero, as shown by the curve (e), for stopping the EGR operation.

In FIG. 2-A, the temperature correction factor $K_1$ is gradually increased or decreased as shown by the straight curves (b) or (d), in order to increase or decrease the correction factor between the values 0.0 and 1.0. However, instead of changing the correction factor as shown by the straight curves (b) and (d), it is also possible to change the correction factor $K_1$ as shown by FIG. 2-A'. In this case, the increase of the correction factor $K_1$ occurring within a temperature range of between $-30°$ C. and $0°$ C. is represented by a steplike curve as shown by steplike phantom curve (b'), and the decrease of the correction factor $K_i$ occurring within a temperature range of between $40°$ C. and $60°$ C. is shown by the steplike phantom curve (d').

FIG. 2-B indicates a relation between the temperature $T_2$ (temperature of the engine cooling water in the engine water jacket at a position near the inlet of the engine radiator) and the temperature correction factor $K_2$ of the EGR ratio. When the temperature $T_2$ is lower than $0°$ C. due to the fact that the engine is under a warming-up condition, the temperature correction factor $K_2$ is determined to be zero as shown by the curve (f). Due to such a temperature condition, the EGR operation is stopped for effecting an ideal warming-up operation. Within a temperature range of between $0°$ C. and $60°$ C. for the temperature $T_2$, the correction factor $K_2$ is increased as shown by a straight curve (g), in order to gradually increase the EGR ratio. Between the range of $60°$ C. and $95°$ C. within which the engine normally operates, the correction factor $K_2$ is equal to 1.0 as shown by the curve (h), for recirculating a sufficient amount of exhaust gas to decrease the $NO_x$ emission from the engine. When the temperature $T_2$ reaches $95°$ C., the correction factor $K_2$ is instantly decreased to a value of zero as shown by the curve (i), in order to prevent overheating of the engine.

Instead of changing the correction factor $K_2$ between the range of $0°$ C. and $60°$ C. as shown by the straight curve (g) in FIG. 2-B, it is also possible to change the correction factor $K_2$ as shown by the steplike phantom curve (g') in FIG. 2-B'.

FIG. 2-C indicates an example of a relation between the engine cylinder block temperature $T_3$ (temperature of the engine cooling water in the engine water jacket at a position near the outlet of the engine radiator) and the temperature correction factor $K_3$ of the EGR ratio. In the example, the temperature correction factor $K_3$ is so determined that it is zero when the temperature $T_3$ is lower than $5°$ C. The factor $K_3$ is gradually increased within a temperature range of between $5°$ C. and $15°$ C. as shown by the curve (j). The factor $K_3$ is maintained at a value of 1.0 after the temperature $T_3$ reaches $15°$ C.

In another example shown by FIG. 2-C', the factor $K_3$ is changed in a steplike fashion, as shown by the phantom curve (j'), when the temperature $T_3$ is within a range of between $5°$ C. and $15°$ C.

(4) Fourthly, the values of the correction factors $K_1$, $K_2$ and $K_3$, which are determined as shown by FIGS. 2-A, B and C (or A', B' and C'), are stored and mapped in the memory 45 (FIG. 1). The stored values of the correction factors $K_1$, $K_2$ and $K_3$ are read out, during the time when the engine is being operated, by the computer 43 programmed to respond to electric signals indicating values corresponding to the intake air temperature $T_1$, the engine cooling water temperature $T_2$ and the engine cylinder block coolant temperature $T_3$. In order to obtain these signals, sensors 61, 63 and 65 are utilized. The sensor 61 mounted on the intake passageway 12 at a position located upstream of the air flow sensor 47 is adapted for detecting the temperature of the intake air directed to the throttle valve 11. The sensor 61 is of a type in which the electrical resistance is changed in accordance with the temperature. Thus an analogue signal indicating the temperature $T_1$ can be obtained. The sensor 61 is connected to the computer 43 via an electrical line l₅ for issuing an electrical signal for indicating the intake air temperature $T_1$. The sensor 63 is mounted on the engine body for detecting the engine cooling water temperature $T_2$ in a water jacket at a position near the inlet of the radiator. The sensor 63 is connected to the computer 43 via an electrical line l₆ for issuing an electrical signal indicating the temperature $T_2$. The third sensor 65 is mounted on the engine body 10 for detecting the engine cylinder block cooling water temperature $T_3$ in the water jacket at a position near the outlet of the radiator. The sensor 65 is connected to the computer 43 for issuing an electrical signal indicating the temperature $T_3$.

(5) The computer 43, which receives the electrical signals from the intake air amount sensor 47, the rotational speed sensor 49, the intake pressure sensor 51, the intake air temperature sensor 61, the engine cooling water temperature sensor 63 and the engine cylinder block cooling water temperature sensor 65, is programmed to form a logic signal "1" or "0" directed to the EGR valve actuator drive circuit 42. Thus, the solenoid 39 of the EGR valve actuator 33 is selectively energized or de-energized for controlling the opening of the EGR valve 19 in such a manner that the calculated intake pressure $P_{ref}$ (equation (2)) conforms to the measured intake pressure $P_{real}$ detected by the sensor 51. The program of the computer 43 is now described with reference to the flow diagram shown in FIG. 3.

The computer program is entered at the step identified by the reference numeral 91.

At a step 93 in the program, a value of the temperature correction factor $K_1$, which corresponds to the temperature $T_1$ of the intake air detected by the sensor 61, is read out from the values of $K_1$ which are preliminarily mapped into the memory 45.

At the step 95, the discrimination of the read out value of $K_1$ takes place to determine whether this value is zero or not.

If the result of the discrimination process at step 95 is "YES," the program proceeds to a step 97 where the EGR actuator 39 (FIG. 1) is operated by the drive circuit 42 for receiving a logic signal from the computer 43 so that the valve member 25 of EGR valve 19 is moved toward the valve seat 27. As a result, the EGR operation is stopped.

If the result of discrimination process at step 95 is "NO," the program proceeds to a step 99. At the step 99, a value of the temperature correction factor $K_2$, which corresponds to the temperature $T_2$ of the engine cooling water detected by the sensor 63, is read out from the values of $K_2$ which were preliminarily mapped into the memory 45.

At the next step 100, the read out $K_2$ value is discriminated to see if it is zero or not.

If the result of the discrimination process at step 100 is "YES", the program proceeds to the previously-mentioned step 97 in order to stop the EGR operation as already described hereinbefore.

If the result of the discrimination process at step 100 is "NO," the program proceeds to a step 101.

At the step 101, a value of temperature correction factor $K_3$, which corresponds to the temperature of the engine cylinder block cooling water $T_3$ detected by the sensor 65, is read out from the $K_3$ values which were preliminarily mapped into the memory 45.

At step 102, the read out value $K_3$ is discriminated as to whether this value is zero or not.

If the result of the discrimination process at step 102 is "YES," the program proceeds to the previously-described step 97 for stopping the EGR operation.

If the result of the discrimination process at the step 102 is "NO," the program proceeds to a step 103. At step 103, a value of the intake pressure $P_{map}$ which corresponds to a set of values corresponding to the amount of intake air Ga sensed by the sensor 49 and corresponding to the engine rotational speed N sensed by the sensor 49, is read out from the $P_{map}$ values which were mapped into the memory 45.

At the next step 104, the equation for calculating the intake pressure $P_{ref}$ above-mentioned equation (2) is calculated by using the values of Ga, N, $K_1$, $K_2$, $K_3$ and $P_{map}$.

The program then proceeds to a decision step 106 where discrimination takes place as to whether or not an actually sensed value of an intake pressure value $P_{real}$ sensed by the sensor 51 is larger than the calculated value of $P_{ref}$ at the previous step 104.

The inequality $P_{real} > P_{ref}$ (YES) indicates that the amount of the recirculated gas is too large for maintaining the desired EGR ratio. In this case, the program proceeds to the previously-mentioned step 97 where the EGR actuator 33 is operated by the drive circuit 42 for receiving a logic signal from the computer 43 so that the valve member 25 of the EGR valve 19 is moved toward the valve seat 27 for decreasing the amount of EGR gas. As a result, the EGR ratio is decreased to the desired value.

The inequality $P_{real} < P_{ref}$ (NO) indicates that the amount of the recirculated gas is too small for maintaining the desired EGR ratio. In this case, the program proceeds to a step 107 where the EGR actuator 33 is operated by the drive circuit 42 (FIG. 1) for receiving a logic signal from the computer 43 so that the valve member 25 the EGR valve 19 is moved toward the valve seat 27, for increasing the amount of EGR gas. As a result, the EGR ratio is increased to the desired value.

At the step 108, the program returns to the entry step 91, in order to repeat the above-described program.

Figure 3:
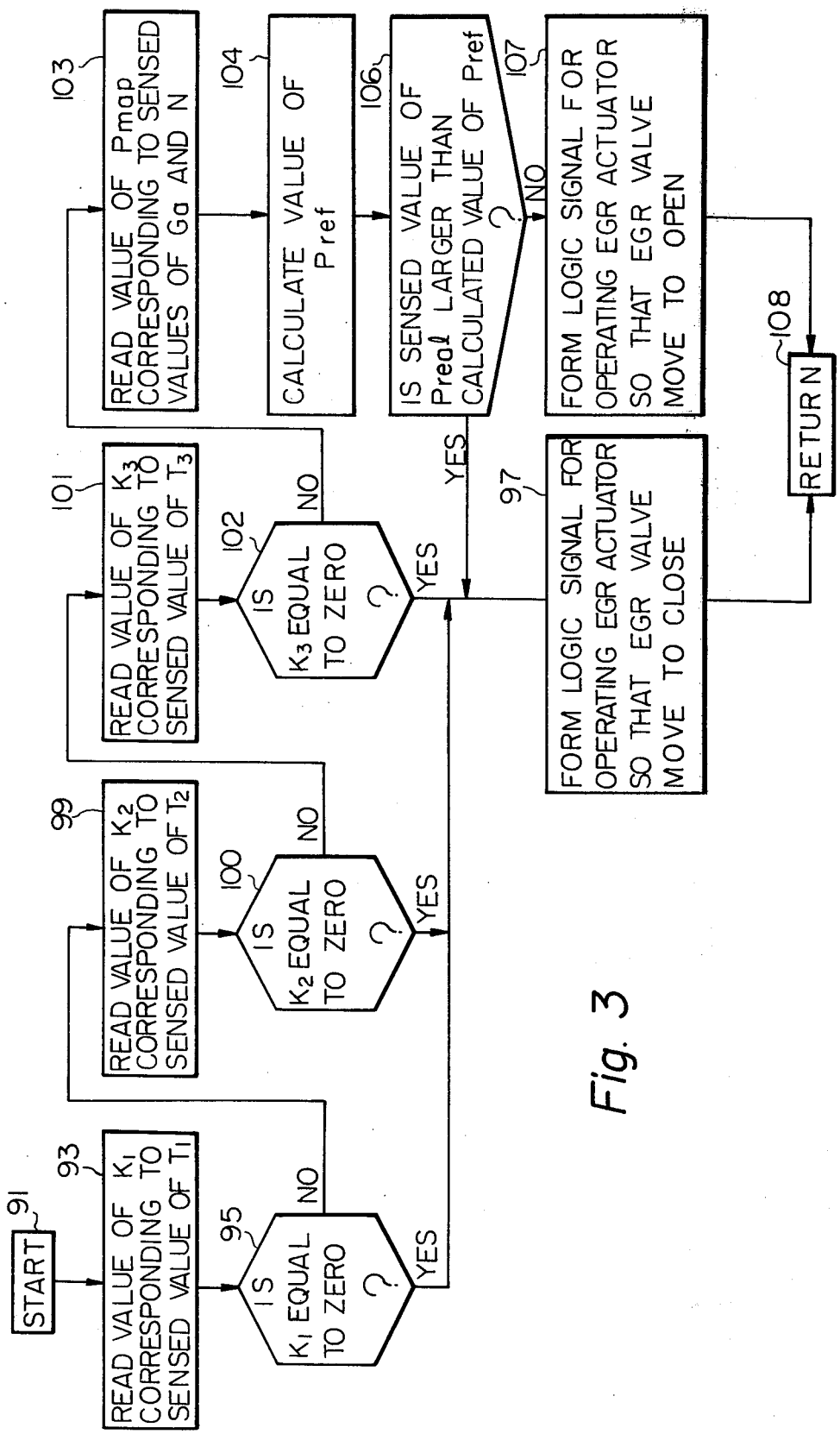
FIG. 3 is a flow diagram of a program of the computer shown in FIG. 1.
Figure 5:
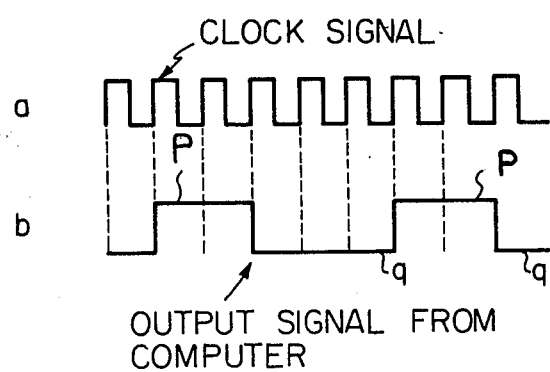
FIG. 5 shows various pulse signals produced by the computer shown in FIG. 1.

The construction of an embodiment of the computer 43 for processing the program shown in FIG. 3 will be described hereinafter with reference to FIG. 4, which indicates a schematic diagram of the computer 43. According to FIG. 4, the computer 43 has a central processing unit (CPU) 85 connected to the memory 45. The values of the intake pressure $P_{map}$ and the values of the temperature correction factors $K_1$, $K_2$ and $K_3$ as well as the program of FIG. 3 are stored in the memory 45. The computer 43 has a clock pulse generator 84 for providing a clock signal "a" as shown in FIG. 5. The CPU 85 operates, in accordance with the signals from the sensors 47, 49, 51, 61, 63 and 65, to calculate the program of FIG. 3 during a period determined by the clock signal "a" transmitted from the clock generator 84.

The computer 43 has a counter 81 connected to the engine rotational speed sensor 49. The counter 81 counts the number of pulses in the signal transmitted from the engine rotational speed sensor 49 within a predetermined number of clock pulses generated by the generator 84. As a result, a digital signal indicating the engine rotational speed N is issued to the CPU 85.

The computer 43 further has an analogue multiplexer 82 connected to the analogue sensors 47, 51, 61 and 63, in order to sequentially receive the analogue signals therefrom under the instruction of the CPU 85. The analogue multiplexer 82 is connected to an analogue-todigital (A/D) converter 83 for converting analogue signals into digital signals. Thus digital signals indicating the amount of intake air Ga, the intake air temperature $T_1$, the engine cooling water temperature $T_2$ and the engine cylinder block cooling water temperature $T_3$ are received by the CPU 85.

The CPU 85 (which can be comprised of, for example, a micro-processor of 12 bits) reads, in synchronization with the clock signal from the clock generator 84, the stored values of $K_1$, $K_2$ and $K_3$ from the memory 45 by utilizing the temperature signals from the temperature sensors 61, 63 and 65. When one of the read out values of $K_1$, $K_2$ or $K_3$ is zero, the CPU 85 issues a logic signal "1," as shown in FIG. 5, into the transistor 44 of the drive circuit 42 (This logic signal "1" is produced when the clock signal is built up as shown by P in FIG. 5.) Thus, the transistor 44 is switched to its ON condition for energizing the solenoid 39 of the actuator valve 33. As a result, the vacuum level in the chamber 29 of the EGR valve 19 is decreased. Accordingly the valve 25 is moved for stopping the EGR operation.

When all of the values of $K_1$, $K_2$ and $K_3$ are larger than zero, the CPU 85 reads a stored value of the pressure $P_{map}$ from the memory by employing the signals transmitted from the rotational speed sensor 49 and the intake air amount sensor 47, and calculates the equation (2) for calculating the intake pressure $P_{ref}$. Thereafter, the CPU 85 operates, in synchronization with the clock signal, to discriminate whether the value of $P_{real}$ from the intake pressure sensor 51 is larger or smaller than the calculated value of $P_{ref}$. When the value of $P_{real}$ is larger than $P_{ref}$, the CPU 85 operates to provide a logic signal "1" as shown by P of FIG. 5. This signal is formed when a clock pulse is built up. The logic signal "1" is issued to the transistor 44 (FIG. 4) for switching it to the ON condition, in order to energize the solenoid 39 of the actuator 33. The valve member 25 of the EGR valve 19 is thus moved toward the valve seat 27 for decreasing the amount of exhaust gas to be recirculated as fully described hereinbefore. When the value of $P_{real}$ is smaller than $P_{ref}$, the CPU 85 operates to provide a logic pulse "0" as shown by "q" of FIG. 5. Accordingly, the transistor 44 is switched to its OFF condition in order to de-energize the solenoid 39 of the actuator 33. Therefore, the vacuum level in the chamber 29 is increased, so that the valve member 25 is moved away from the valve seat 27 for increasing the amount of exhaust gas to be recirculated.

Figure 6:
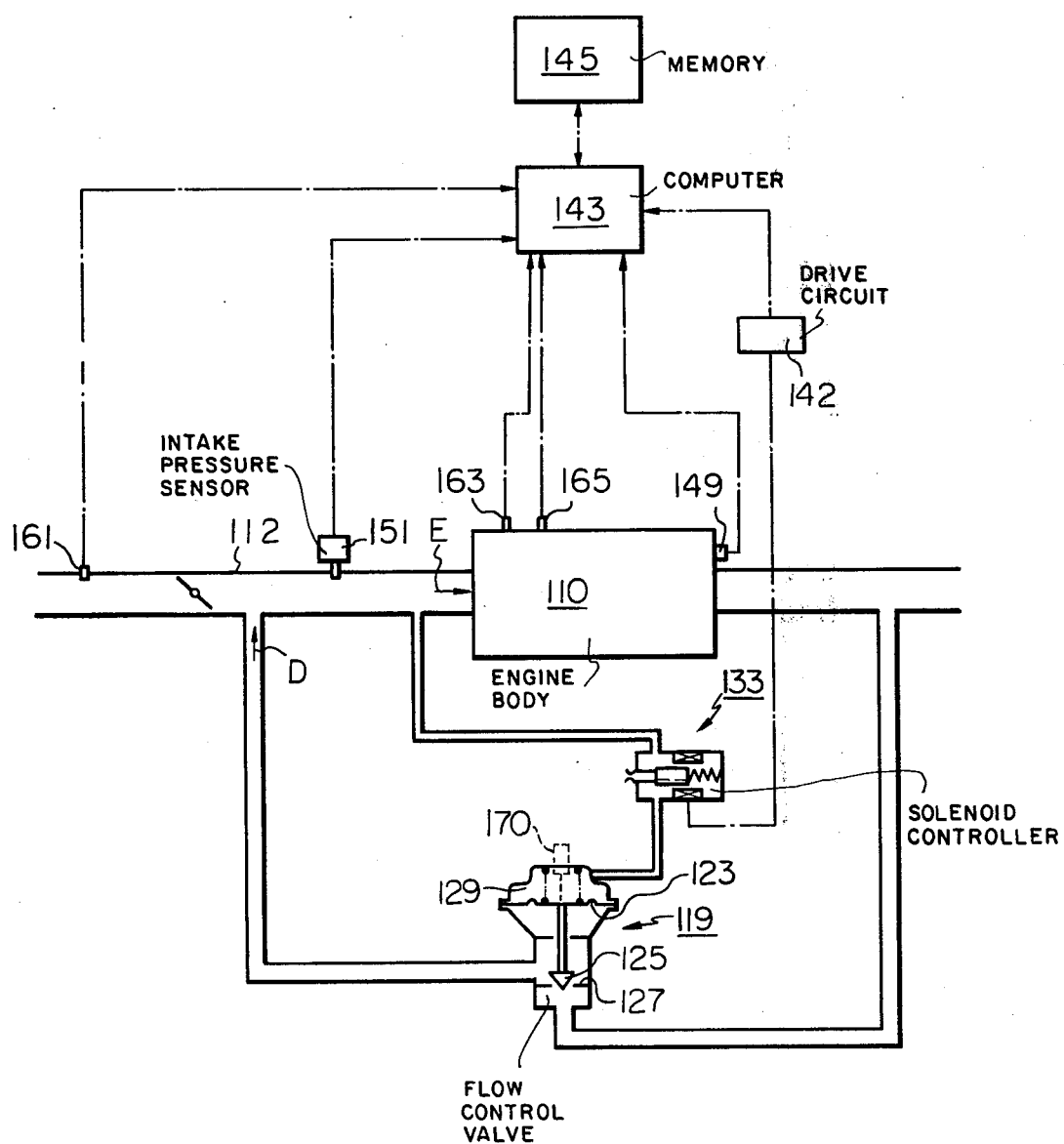
FIG. 6 shows another embodiment of a computer-controlled EGR apparatus.

In the second embodiment shown in FIG. 6, in order to control the EGR operation by the computer system, the following principle is utilized. In FIG. 6, the amount of the exhaust gas required for maintaining a desired EGR ratio is determined by the engine intake system conditions, for example, the engine rotational speed N and the intake pipe vacuum P (or the total amount of gas directed to the engine 110 as shown by an arrow E). Since the amount of the exhaust gas to be recirculated corresponds to the opening of the EGR valve 119, the EGR ratio is maintained to a desired value during the occurrence of the corresponding engine condition if the opening of the EGR valve 119 is controlled in accordance with the engine conditions. The opening of the EGR valve is determined by a parameter indicating the position of the valve member 125 with respect to the valve seat 127, for example, the vacuum level in the chamber 129, the position of the diaphragm 123, or the duty ratio of the logic signal (FIG. 5-b) issued to the actuator drive circuit 142 from the computer 143.

Values of the parameter, which conform to values of the EGR valve opening during every kind of engine conditions, are preliminarily stored in the memory 145 so that a desired EGR characteristic is obtained in every kind of engine conditions. The computer 143 operates to receive a signal indicating a value of N from the engine rotational speed sensor 149 and a signal indicating a value of the intake pressure P from the intake pressure sensor 151. The computer 143 is programmed to respond to these signals for reading a value from the values of the EGR valve opening parameter $S_{map}$ stored in the memory 145, and to provide a logic signal issued to the EGR actuator drive circuit 142. Accordingly, the opening of the EGR valve 119 can be controlled so that the EGR ratio is maintained to a desired value which corresponds to each kind of engine conditions.

In the computer control of the EGR system, as schematically illustrated with reference to FIG. 6, the temperature correction of the EGR ratio is also necessary as is described in the description of the first embodiment. In order to do this, three temperature correction factors $K_1$, $K_2$ and $K_3$ are also utilized ($0 \leq K_1$, $K_2$, $K_3 \leq 1$). Values of $K_1$, $K_2$ and $K_3$ with respect to the temperatures $T_1$, $T_2$ and $T_3$ are determined according to the same manner as is described with relationship to FIG. 2. These values are stored in the memory 145.

The equation for calculating the parameter S of the EGR ratio is as follows:

$$S = K_1 \times K_2 \times K_3 \times S_{map} \tag{6}$$

This equation indicates that the value of the parameter of the EGR ratio is $S_{map}$ when each of the values of $K_1$, $K_2$ and $K_3$ is 1.0. In this case, a sufficient EGR operation is carried out, since the temperature of the engine is within a normal operational range. When one of the values of $K_1$, $K_2$ and $K_3$ is zero, in other words, when the temperature of the engine is not a normal condition, the value of S becomes zero. Thus, the EGR valve 119 is fully closed for stopping the EGR operation.

In order to detect the temperatures $T_1$, $T_2$ and $T_3$ during the operation of the engine, an intake air temperature sensor 161, an engine coolant temperature sensor 163 and an engine cylinder block temperature sensor 165 are utilized. These sensors 161, 163 and 165 are all connected to the computer 143.

The computer 143 has substantially the same design as the computer 43 in FIG. 4.

A program of the computer 143 will now be described with reference to the flow diagram shown in FIG. 7.

The steps 191, 193, 195, 197, 199, 200, 201 and 202 of the program are substantially the same as the steps 91, 93, 95, 97, 99, 100, 101 and 102 of the program in FIG. 3, respectively.

When each of the values $K_1$, $K_2$ and $K_3$ is not zero, the program proceeds to the step 203, where a value of parameter $S_{map}$ of the opening of the EGR valve 119 stored in the memory 145 is read out by using signals indicating the values of N and P transmitted from the engine rotational speed sensor 149 and from the intake pressure signal sensor 151, respectively.

At step 204, the equation $$S = K_1 \times K_2 \times K_3 \times S_{map}$$

is calculated.

At step 207, a logic signal corresponding to the calculated value of S is produced. Accordingly, the opening of the EGR valve should correspond to such a calculated value.

Figure 7:
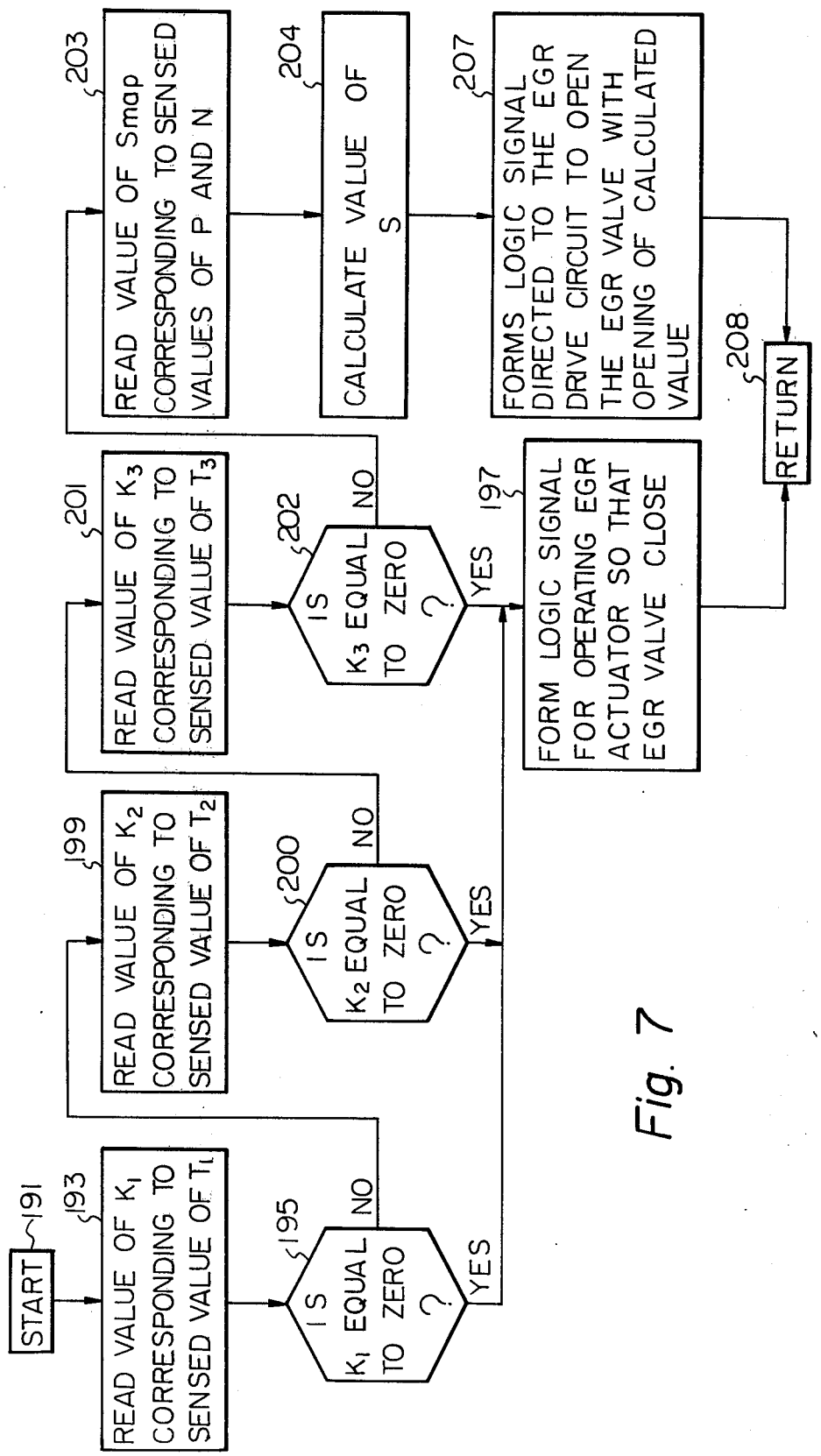
FIG. 7 is a flow diagram of a program of the computer shown in FIG. 6.

At step 208, the program returns to the entry step 191, and waits to receive the next clock pulse for starting the calculation of the program shown in FIG. 7.

As a variation of the embodiment shown in FIGS. 6 and 7, the sensor 170 can be mounted in the EGR valve 119 for detecting the actual values of the parameter $S_{real}$ corresponding to the opening of the EGR valve, for example, the position of the diaphragm 123, or the vacuum level in the chamber 129. Values of the parameter $S_{map}$ of the EGR ratio corresponding to, for example, the position of the diaphragm or the vacuum level in the chamber, are stored in the memory 145. If the amount of the recirculated exhaust gas is so controlled that a value of $S_{real}$ conforms to a value of $S_{map}$, the EGR ratio can be controlled to a desired value which corresponds to a particular engine condition.

While two embodiments are illustrated with reference to the accompanying drawings, many modifications and changes can be made by those skilled in this art without departing from the spirit and scope of the present invention.

What is claimed is:

1. A method for controlling an exhaust gas recirculation device of an internal combustion engine, which device has a pressure-operated flow control valve located on a recirculation passageway connecting the engine exhaust system with the engine intake system, and has an electrically-operated actuator means located on a pressure signal conduit connecting valve for controlling the opening of the flow control valve to control the amount of the exhaust gas to be recirculated, said method comprising the steps of:

(a) initially storing in a memory unit of an electrical computer a set of first values corresponding to the amount of the exhaust gas to be recirculated, each of said first values being predetermined in accordance with a desired amount of exhaust gas to be recirculated when said engine is in a respective operating condition;

(b) initially storing in said memory unit at least one set of second values, each set of second values corresponding to temperature correction factors Ki, where $0 \geq Ki \geq 1$, for altering the amount of exhaust gas to be recirculated, each of said second values of each set being predetermined in accordance with a desired temperature correction factor corresponding to the temperature of a respective portion of said engine;

(c) generating a first electrical signal indicating a sensed respective engine condition during the time when said engine is being operated, by using a first sensor means mounted onto said engine;

(d) generating at least one second signal indicating a sensed temperature of a said respective portion of said engine during the time when said engine is being operated, by using a second sensor means mounted onto said engine;

(e) reading, by said computer, programmed to respond to said first and at least one of said second electrical signals, a first stored value corresponding to the sensed engine condition and at least one second stored value corresponding to the temperature correction factor Ki for a sensed temperature;

(f) calculating, by said computer programmed to respond to said read-out values, a third value corresponding to a desired opening of the pressure-operated flow control valve;

(g) forming, by using said calculated value, a third electrical signal which is transmitted to said electrically-operated actuator means for controlling the opening of said flow control valve; and (h) repeating, at a predetermined interval, steps (c) through (g) during the time said engine is in operation.

2. A method according to claim 1, wherein said forming process of step (g) further includes sensing, by using a third sensor means, an actual value corresponding to the amount of recirculated exhaust gas, said third electrical signal transmitted to the actuator means being so formed that said calculated value in step (f) conforms to the actual value.

3. A method according to claim 1, wherein each of said first values stored during step (a) corresponds to a pressure $P_{map}$ in the intake system of the engine, which pressure is determined to achieve a desired amount of exhaust gas recirculation in accordance with a respective engine condition, said values of $P_{map}$ being related to a set of values corresponding to the amount of intake air Ga and to the rotational speed N of the engine, said first signal in step (c) being comprised of a first part indicating the amount of intake air (Ga) and a second part indicating the rotational speed (N); said calculating process in step (f) including the calculation of the following equation, indicating a calculated pressure $P_{ref}$ value in the intake system:

$$P_{ref}=f(Ga, N)+K_1 \cdot K_2 \cdot K_3 \ldots K_3(P_{map}-f(Ga, N))$$

where f(Ga, N) indicates an algebraic function of GA and N; and wherein said forming process in step (g) further includes sensing, by using a third sensor means mounted to said engine, a value of an actual pressure $P_{real}$ in the engine intake system, said third electrical signal transmitted to an actuator means being so formed that said sensed pressure $P_{real}$ conforms to said calculated pressure $P_{ref}$.

4. A method according to claim 1, wherein each of said values stored in said memory in step (a) is a value $S_{map}$ corresponding to a desired opening of said pressure-operated flow control valve, each value being predetermined in accordance with a respective engine operating condition;

said calculating process in step (f) including a calculation of the following equation for obtaining the value of an EGR ratio S:

$$S = K_1 \cdot K_2 \cdot \ldots \cdot K_i \cdot S_{map};$$

and wherein said forming process in step (g) includes converting said calculated value of S to an electrical signal transmitted to said electrically-operated actuator means so that the opening of said pressure-operated flow control valve conforms to said calculated value of S.

5. A method according to claim 1, wherein three sets of said second values $K_1$, $K_2$ and $K_3$ are stored in said memory in step (b), $K_1$ for indicating correction factors which are predetermined in accordance with the temperature of the intake air in the engine intake system, $K_2$ for indicating correction factors which are predetermined in accordance with the temperature of the engine coolant at a position near the inlet of the engine radiator, and $K_3$ for indicating correction factors which are predetermined in accordance with the temperature of the engine coolant at a position near the outlet of the engine radiator.

6. A method according to claim 1, wherein said values $K_i$ are changed in a steplike fashion within a predetermined temperature range relating to the temperatures of respective portions of the engine.

7. A method according to claim 1, wherein said values $K_i$ are continuously changed within a predetermined temperature range $T_1$ to $T_2$ relating to the temperatures of respective portions of the engine, as determined by the following equation:

$$K_i=(T-T_1)/(T_2-T_1).$$

8. An exhaust gas recirculating device of an internal combustion engine which comprises:
   a recirculation passageway connecting the engine exhaust system with the engine intake system;
   a pressure-operated flow control valve located on the recirculating passageway for controlling the amount of exhaust gas to be recirculated;
   a pressure signal conduit connecting a pressure signal port in the engine intake with the flow control valve;
   an electrically-operated actuator means located in the conduit for controlling the opening of the flow control valve;
   a memory device for storing a set of first values corresponding to the amount of the exhaust gas to be recirculated, said first values being predetermined in accordance with desired amounts of exhaust gas to be recirculated at respective engine operating conditions, and for storing at least one set of second values corresponding to temperature correction factors for the recirculated exhaust gas, each of said second values being predetermined in accordance with a desired temperature correction factor for respective temperatures of a respective portion of the engine;
   a first sensor means for providing, when the engine is operating, a first electrical signal indicating an engine operating condition;
   at least one second sensor means for providing, when the engine is operating, a second electrical signal indicating the temperatures of a respective portion of the engine; and,
   a computer unit programmed, in response to the first and second electrical signals, to read a stored first value and at least one second value, to calculate a value corresponding to opening of the pressure-operated flow control valve from said read-out first and second values, and to form an electrical signal corresponding to said calculated value which is transmitted to the electrically-operated actuator means for controlling the opening of the flow control valve.

9. An exhaust gas purifing apparatus according to claim 8, wherein three second sensor means are utilized for providing a first signal indicating the temperature of the intake air, a second signal indicating the temperature of the engine cooling water and a third signal indicating the temperature of the engine block cooling water, respectively.

* * * * *